May 10, 1932.  E. W. CARPENTER  1,857,140

FLOWER HOLDER

Filed May 9, 1931   2 Sheets-Sheet 1

Inventor
Edward W. Carpenter
By Wooster & Davis
Attorneys

May 10, 1932.　　E. W. CARPENTER　　1,857,140
FLOWER HOLDER
Filed May 9, 1931　　2 Sheets-Sheet 2

Inventor
Edward W. Carpenter
By Wooster & Davis
Attorneys

Patented May 10, 1932

1,857,140

UNITED STATES PATENT OFFICE

EDWARD W. CARPENTER, OF FAIRFIELD, CONNECTICUT, ASSIGNOR TO THE E. W. CARPENTER MANUFACTURING COMPANY, OF BRIDGEPORT, CONNECTICUT, A CORPORATION OF CONNECTICUT

FLOWER HOLDER

Application filed May 9, 1931. Serial No. 536,276.

This invention relates to new and useful improvements in holders for cut flowers, and particularly holders to be placed in jars or vases to hold the individual flowers properly spaced from each other to give a pleasing and artistic appearance to the cluster, and also so the individual flowers will appear to best advantage.

An object of the invention is to provide a flower holder of ornamental appearance and including means for increasing the height of the holder whereby the holder will properly support flowers having relatively short stems and also be adapted for supporting flowers with relatively long stems.

Another object is to provide a flower holder including a plurality of ferrules or shells connected in spaced relation by being disposed in openings in a perforated plate and adapted to receive the stems of cut flowers.

A further object is to provide a flower holder including a base having a raised central portion and a pair of spaced perforated plates supported one on said raised central portion of the base and the other in spaced relation to the base by means of a hollow open ended centrally disposed post.

An additional object is to provide a flower holder including open ended tapered ferrules or shells adapted to be partially received one within the other whereby to increase the height of the holder to have it properly accommodate and support flowers having different lengths of stems.

Other objects and advantages will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims to which claims reference should be had for a definition of the invention.

Figure 1:
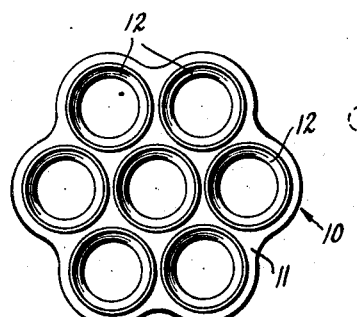
Fig. 1 is a plan view of one form of flower holder in accordance with the present invention.
Figure 2:
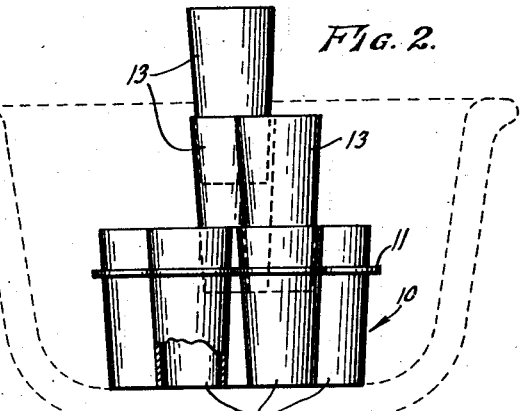
Fig. 2 is a view of the flower holder in side elevation, a portion of one of the ferrules of the holder being broken away and the holder being shown as disposed within a bowl.
Figure 3:
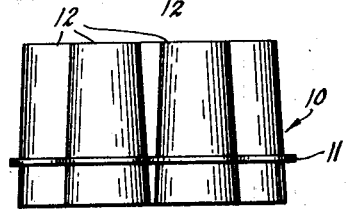
Fig. 3 is a side elevational view of the flower holder of Figs. 1 and 2 with its position reversed.

Referring in detail to the drawings and at first particularly to the cluster of ferrules or shells forming the flower holder of Figs. 1, 2 and 3 and generally designated 10, this flower holder comprises a perforated plate 11 of any desired size and having any desired number or arrangement of perforations. The outer edge of the perforated plate 11 is preferably irregular as clearly shown in Fig. 1 whereby to give a scalloped effect, but of course is not necessarily so shaped.

Disposed in the respective perforations of plate 11 and extending from each side of the plate are shells or ferrules 12, one such shell or ferrule being preferably inserted in each opening in the plate. The ferrules 12 are tapered as shown and each ferrule is preferably tapered to the same extent whereby they will all project the same distance at each side of the plate when dropped into perforations of the same diameter. That is, the upper and lower surface or edge of each ferrule is in the plane of the upper and lower surface of each of the other ferrules. The ferrules 12 are soldered or otherwise secured to the plate 11 whereby the ferrules will not drop out of the plate, and the cluster thus formed may be painted or enameled or otherwise finished.

In Fig. 2 additional ferrules designated 13 are shown. These ferrules are duplicates of the ferrules 12 and are adapted to have their smaller ends partially received in the larger ends of the ferrules 12. Also, each of the ferrules 13 are adapted to have their smaller ends received in the larger open ends of one another and accordingly the height of the flower holder may be increased as desired whereby to have the same properly support flowers having different lengths of stems from very short to relatively long stems. The ferrules 13 are preferably painted or finished to correspond with the painting or finishing of the ferrules 12.

Figure 4:
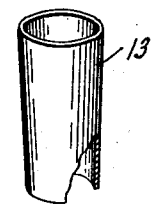
Fig. 4 is a perspective view of a ferrule alone and having a part broken away.
Figure 5:
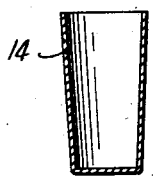
Fig. 5 is a vertical sectional view of a ferrule having a closed end.

The ferrules 12 and 13 may be fully opened at each of their ends as shown in Fig. 4 or certain of the ferrules, as for example the ferrule designated 14 in Fig. 5, may have one end closed whereby the same is adapted to contain water. Since the ferrules 12 have their ends all in the same plane it will be apparent that the flower holding cluster 10 may be supported on the smaller or reduced ends of the ferrules as shown in Fig. 2 or on the larger or open ends as shown in Fig. 3. In the latter position it is more adapted for supporting flowers with smaller stems in a more upright position than when the larger ends of the ferrules are uppermost as in Fig. 2.

Figure 6:
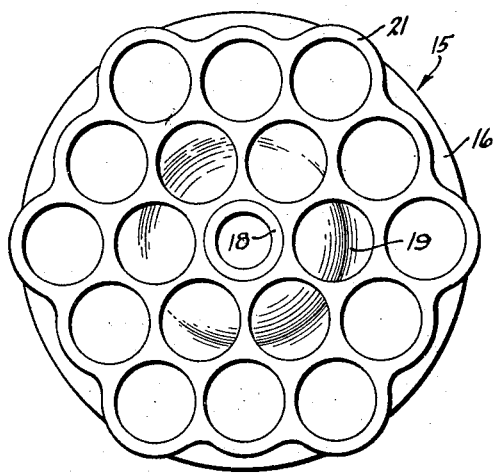
Fig. 6 is a plan view of a slightly modified form of flower holder.
Figure 7:
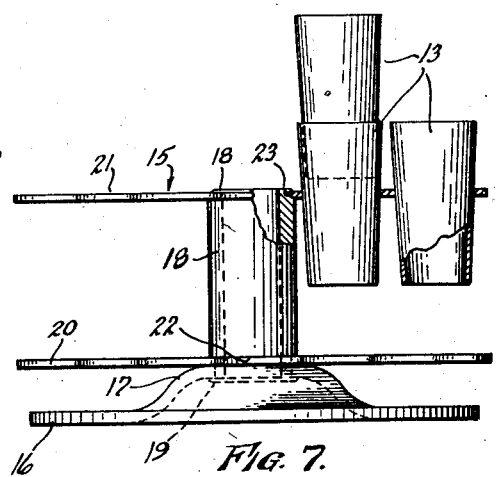
Fig. 7 is a side elevational view of the flower holder of Fig. 6, a few ferrules being shown in place and parts being broken away to show details of construction.

The flower holder of Figs. 6 and 7 and which is generally designated 15 includes a relatively heavy base plate 16 having its central portion raised or off-set upwardly as at 17 whereby the plate is somewhat hollow at its under side. A hollow open ended post 18 has a reduced end passed through the base and has its lower end upset as at 19 whereby the post is rigidly secured to the base. Of course, it will be understood that the post may be secured to the base in any other suitable manner as for example by providing screw threads and threading the post into the base.

Holder 15 also includes upper and lower spaced perforated plates 20 and 21 which plates may be duplicates and which plates are perforated throughout their entire area and have irregular or scalloped edges. The plate 20 is arranged with its central portion between the raised central portion 17 of the base whereby the plate is for the most part supported in spaced relation to the base. At its lower end portion the post 18 is reduced to provide a shoulder 22 and the reduced portion of the post passes through the base and a central perforation in the plate 20 and when the post is secured to the base the plate 20 is clamped between the upper surface of the central portion 17 of the base and the shoulder 22 of the post. Therefore, the plate is properly secured to the base.

Plate 21 is also supported by the post 18 and is preferably supported by the upper end portion of the post. As shown, the upper end portion of the post is slightly reduced to provide a shoulder 23 and the plate 21 is disposed over the post with the reduced upper end of the post extending through a central perforation in the plate and with the plate resting on the shoulder 23. The upper end of the plate is then upset whereby to clamp the plate against the shoulder 23 and properly secure the plate to the post.

The flower holder 15 of Figs. 6 and 7 is adapted to receive the ferrules or shells 13. In Fig. 6 a few of the shells are shown in place and one shell is shown as having its reduced end portion received in the opened end portions of another shell. The idea is, of course, to increase the height of the holder as desired whereby to give proper support of the stem of a flower when such stem is of considerable length. These ferrules will be finished as by painting, to agree with the finish of the main portion of the holder and any desired number of ferrules may be supplied with a holder.

From the foregoing description it will be seen that the flower holder of Figs. 1, 2 and 3 comprises only a single perforated plate through the perforations of which are inserted a plurality of tapered ferrules or shells. The holder of Figs. 6 and 7 comprises only a base, a post, and a pair of perforated plates held in position by the base and post. In connection with this second form of the invention it will also be noted that the post 18 being hollow and open at its ends is adapted to receive the stem of a flower whereby there need be no break in the arrangement of the flowers in the holder.

Figure 8:
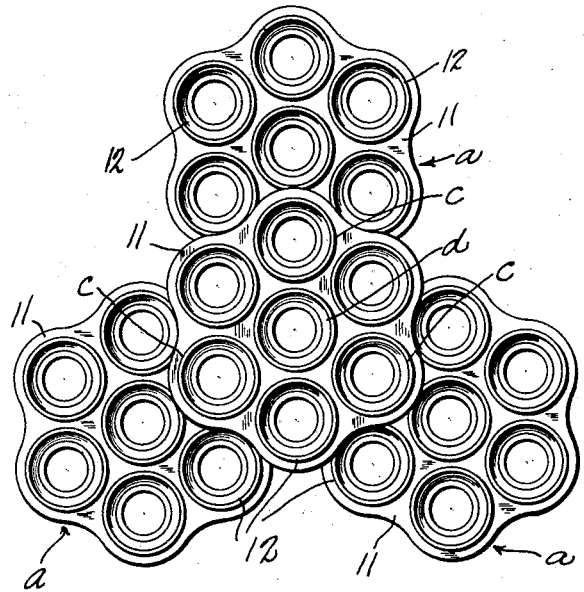
Fig. 8 is a top plan view showing how a plurality of the holders may be combined.
Figure 9:
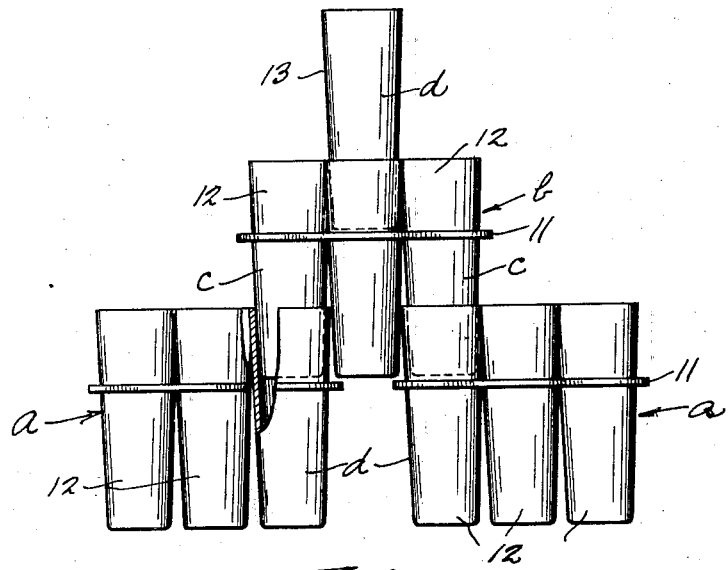
Fig. 9 is a side elevation thereof with parts broken away to more clearly show the construction.

Figs. 8 and 9 show how a plurality of these holders can be combined to build up a holder of different size, shape or height, the showing of these figures showing merely one example, it being understood that the holders may be combined in different ways to form composite holders of different sizes, shapes and heights as desired. As illustrated four of the holders of Figs. 1, 2 and 3 are combined, there being three holders indicated at *a* resting on a support, not shown, as the bottom of bowl or dish of suitable size as suggested by the dotted outline in Fig. 2. Then a third holder indicated at *b* is mounted between them with certain of the tapered tubes or ferrules 12 nesting at their lower ends in the upper ends of certain of the tapered tubes or ferrules 12 of the lower holders *a*. This can be readily accomplished as the tubes or ferrules are tapered and of the same size. Thus the three ferrules indicated at *c* of holder *b* are inserted at their lower ends in the upper ends of ferrules *d* in holders *a*. This elevates holder *b* above holders *a* so that longer stemmed flowers may be supported in the central portion of the built up holder. The holder *b* also thus forms a tieing member to secure the holders *a* together in the built up holder. One or more single ferrules 13 indicated at *d* may be applied to any of the holders *a* and *b*. As shown one is applied to the center ferrule of holder *b* providing a high central support for a central flower of a very long stem. It will be evident from the above that any number of the holders may be combined and as desired in various shapes and heights to form built up holders for various shapes and sizes of bouquets and to hold flowers of various lengths of stems so that the various applications of these holders is practically unlimited.

Having thus set forth the nature of my invention, what I claim is:

1. A flower holder comprising a perforated plate, a plurality of tapered ferrules in the perforations in the plate and supported in spaced relation by the plate to form a cluster, said ferrules projecting at both sides of the plate, and said ferrules having their ends at one side of the plate arranged in the same plane to support the cluster in horizontal position on said ends being disposed on a supporting surface.

2. A flower holder comprising a perforated plate, a plurality of ferrules secured one in each of the perforations in the plate whereby a cluster is formed, said ferrules at the respective sides of the plate each projecting the same distance, and said cluster adapted to be supported to receive the stems of flowers in the ferrules by engagement of either of the ends of the ferrules with a supporting surface.

3. A flower holder comprising a perforated plate, a plurality of tapered ferrules received in the perforations and extending from each side of the plate, and other tapered ferrules adapted to be partially received by the first ferrules to adjustably increase the height of the holder to have the same properly support flowers having relatively long stems.

4. A flower holder comprising a base, a pair of perforated plates, a hollow open ended post secured at its lower end to the base, said post securing said pair of perforated plates to the base and in relative spaced relation, and a plurality of ferrules adapted to be partially received in the perforations in one of said plates and in each other to increase the height of the holder whereby to accommodate the holder to flowers having relatively long stems.

5. A flower holder comprising a plurality of open ended ferrules, said ferrules being tapered and adapted to have the smaller end portions of one partially telescope within the larger end portion of the other whereby holders of various heights may be built up of a number of ferrules.

6. A flower holder comprising a plurality of open ended ferrules, means for securing the ferrules together side by side, said ferrules being tapered and the ferrules of one holder being adapted to partially telescope within similar ferrules of another holder whereby composite holders of different sizes and heights may be built up of a plurality of the individual holders.

7. A flower holder comprising a plurality of tapered ferrules, means for securing the ferrules together side by side, and other tapered ferrules adapted to be partially received by the first ferrules to adjustably increase the height of the holder to have the same properly support flowers having relatively long stems.

8. A flower holder unit comprising a plurality of open ended ferrules, said ferrules having one end smaller than the other and adapted to have the smaller end portion of one partially telescope within the larger end portion of the other whereby holders of various heights may be built up of a number of the units.

9. A flower holder unit comprising a plurality of open ended ferrules, means for securing the ferrules together side by side, said ferrules having one end smaller than the other and adapted to partially telescope within the larger end of similar ferrules of another unit whereby composite holders of different sizes and heights may be built up of a plurality of the individual units.

In testimony whereof I affix my signature.

EDWARD W. CARPENTER.